No. 612,276. Patented Oct. 11, 1898.
E. A. SANFORD.
POTATO SPROUTER.
(Application filed Sept. 17, 1897.)
(No Model.)
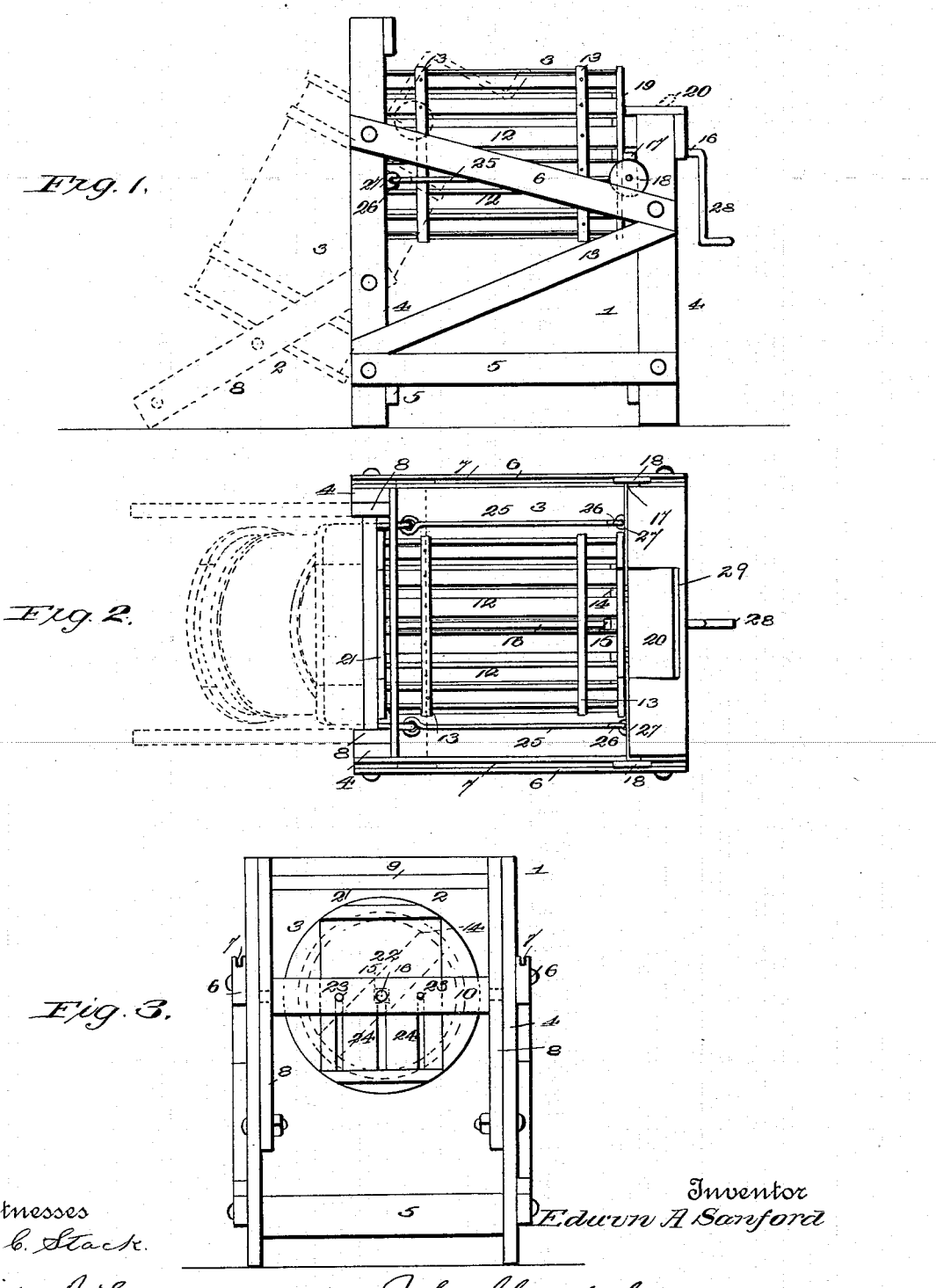
Witnesses
Jos. C. Stack.
Victor J. Evans
Inventor
Edwin A. Sanford
By John Wedderburn Attorney

UNITED STATES PATENT OFFICE.

EDWIN A. SANFORD, OF CASTILE, NEW YORK.

POTATO-SPROUTER.

SPECIFICATION forming part of Letters Patent No. 612,276, dated October 11, 1898.

Application filed September 17, 1897. Serial No. 652,046. (No model.)

*To all whom it may concern:*

Be it known that I, EDWIN A. SANFORD, a citizen of the United States, residing at Castile, in the county of Wyoming and State of New York, have invented certain new and useful Improvements in Potato-Sprouters; and I do hereby declare the following to be a full, clear, and exact description of the invention, such as will enable others skilled in the art to which it appertains to make and use the same.

This invention relates to improvements in machines for preparing potatoes for planting; and it consists of certain novel constructions, combinations, and arrangements of parts, all of which will be hereinafter more particularly set forth and claimed.

In the accompanying drawings, forming part of this specification, Figure 1 represents a side elevation of a machine embodying my invention in its operative position, the dumping position being indicated by dotted lines. Fig. 2 represents a top plan view of the same. Fig. 3 represents a front elevation of said machine.

1 in the drawings represents the supporting-frame, 2 the hinged frame, and 3 the rotatable drum or cylinder. Said frame 1 comprises vertical standards 4, suitably connected and braced at their bases by cross-bars 5. Each side of said frame is provided with an inclined bar 6, formed in its upper surface with a groove 7, the office of which will be hereinafter more particularly described.

The pivoted frame 2 comprises side bars 8, the lower ends of which are pivoted to the standards 4, while the upper ends are connected by a cross-rod 9. This frame 2 is adapted to form a support for one end of the cylinder 3 and in this connection is provided with a pivoted cross-bar 10, formed at its opposite ends with trunnions 11, which are journaled in the said bars 8. Said drum 3 comprises a plurality of spaced bars 12, connected together by hoops 13. The ends of a portion of said bars 12 are connected by cross-heads 14, which are secured upon squared portions 15 of the drum-supporting shaft 16. The rear of said shaft is journaled in the cross-piece 10, while the forward end is mounted in a cross-piece 17, which is provided at each end with an antifriction-wheel 18, said wheels running in the grooves 7 of the bars 6, for a purpose hereinafter described. Said bar 17 supports a head 19, which latter closes the forward end of the drum, but does not rotate therewith. This head 19 has a hinged door 20, by means of which the potatoes may be placed in the drum. The rear end of said drum is closed by a head 21, secured to the cross-bar 10 and provided with a slide 22, whereby the potatoes may be discharged from the drum when so desired. This slide is secured and guided in position by means of the shaft 16 and a plurality of guiding-pins 23, which latter are secured to the cross-bar 10 and project through suitable slots 24, formed in said slide. The said bars 10 and 17 are connected so as to hold the respective heads of the drum against the ends of the bars 12 by rods 25, provided with hooked ends 26, adapted to pass through suitable screw-eyes 27 upon the respective bars. The forward end of the shaft 16 projects beyond the frame 1 and is bent to form a crank-handle 28 for operating said shaft. The forward portion of the frame 1 is cut away, as at 29, so that the door 20 may be opened when the drum is in its operative position for the insertion of the potatoes. It will be observed from the foregoing description that when said drum is in a horizontal position a rotation of the same will so agitate the potatoes as to cause all the sprouts to drop from the same through the bars. After this operation has been completed the frame 2 is tipped forward by grasping the cross-bar 9, so as to bring the drum into approximately a vertical position, the wheels 18 in the meantime passing along within the grooves 7 from one end of each of the bars 6 to the other. The drum is now in position to discharge the tubers upon the slide 22 being operated as before described.

The construction and operation are very simple and cheap, and the drum may be loaded and unloaded and tipped from its horizontal operative position to its inclined or approximately vertical discharging position with a minimum amount of friction.

The construction of the parts is such that there is very little liability of the same becoming disarranged or injured during the operation of the drum or the tipping of the same to discharge its contents. If for any reason it is desired to temporarily remove the respective heads from the drum, the hooks 26 are simply disengaged from their respective eyes and the heads slid longitudinally upon the shaft 16 away from the ends of the bars 12. When the drum is in its dumping position, the upper ends of the bars 8, comprising the swinging frame, rest upon the ground, and thus form a firm support for the drum.

Having thus described my invention, what I claim as new, and desire to secure by Letters Patent, is—

1. The combination of a supporting-frame having longitudinally-extending guideways thereon, an auxiliary frame pivoted to said supporting-frame, a drum mounted at one end in said auxiliary frame, and rollers upon the opposite end of said drum moving in said guideways.

2. The combination of a supporting-frame, an auxiliary frame pivoted thereto, a drum mounted at one end in said auxiliary frame and having a sliding connection at its opposite end with the main frame, said drum comprising a plurality of spaced bars, heads for said drum secured to the auxiliary frame independent of said bars, and doors in said heads.

3. The combination of a supporting-frame having inclined guideways thereon, an auxiliary frame pivoted thereto, including a pivotally-mounted cross-bar, a bar carrying rollers at its opposite end moving in said guideways, drum-heads secured to said bars, and a drum located between said heads and capable of rotation independent thereof, as and for the purpose set forth.

4. The combination with a suitable supporting-frame, of an auxiliary frame pivotally mounted thereon, a drum comprising spaced bars having one end pivotally mounted in said auxiliary frame, and antifriction-rollers mounted on the opposite end of said drum and adapted to rest upon the main frame, substantially as described.

5. The combination with a suitable supporting-frame, of an auxiliary frame pivotally mounted on the same, a pivoted bar mounted on said auxiliary frame, a shaft having one end journaled in said bar, a drum-head mounted on said bar, a drum mounted on said shaft, a cross-bar having antifriction-wheels resting upon the main frame, a head mounted on said latter cross-bar, and removable rods connecting said heads whereby they may be adjusted toward or away from the ends of the drum proper at will, substantially as described.

In testimony whereof I have signed this specification in the presence of two subscribing witnesses.

EDWIN A. SANFORD.

Witnesses:
E. V. SPELLMAN,
ADA M. GROVES.